US009722841B1

(12) United States Patent
Guvenkaya et al.

(10) Patent No.: US 9,722,841 B1
(45) Date of Patent: Aug. 1, 2017

(54) CHANNEL-BASED CODING FOR WIRELESS COMMUNICATIONS

(71) Applicants:Ertugrul Guvenkaya, Tampa, FL (US); Huseyin Arslan, Tampa, FL (US)

(72) Inventors: Ertugrul Guvenkaya, Tampa, FL (US); Huseyin Arslan, Tampa, FL (US)

(73) Assignee: UNIVERSITY OF SOUTH FLORIDA, Tampa, FL (US)

(*) Notice: Subject to any disclaimer, the term of this patent is extended or adjusted under 35 U.S.C. 154(b) by 0 days.

(21) Appl. No.: 14/796,163

(22) Filed: Jul. 10, 2015

Related U.S. Application Data

(60) Provisional application No. 62/025,167, filed on Jul. 16, 2014.

(51) Int. Cl.
*H04L 5/00* (2006.01)
*H04L 27/26* (2006.01)

(52) U.S. Cl.
CPC ........ *H04L 27/2626* (2013.01); *H04L 5/0005* (2013.01); *H04L 5/0051* (2013.01)

(58) Field of Classification Search
CPC ... H03D 1/04; H04B 1/00; H04B 1/44; H04B 7/00; H04B 7/02; H04B 7/04; H04B 7/10; H04B 17/00; H04L 1/02; H04L 5/0005; H04L 5/0051; H04L 27/00; H04L 27/04; H04L 27/12; H04L 27/20; H04L 27/2626; H04L 27/28; H04Q 7/20; H04W 24/00
USPC ........ 370/203, 252, 310, 334, 338; 375/219, 375/260, 267, 295, 299; 455/63, 67.11, 455/69, 78, 101, 272, 522
See application file for complete search history.

(56) References Cited

U.S. PATENT DOCUMENTS

| | | | | |
|---|---|---|---|---|
| 2003/0210750 A1* | 11/2003 | Onggosanusi | ....... | H04B 7/0634 375/295 |
| 2004/0125900 A1* | 7/2004 | Liu | .......................... | H04B 7/04 375/347 |
| 2004/0196919 A1* | 10/2004 | Mehta | .................... | H04B 7/061 375/267 |
| 2005/0075081 A1* | 4/2005 | Catreux-Erceg | ....... | H04B 7/061 455/78 |
| 2005/0195912 A1* | 9/2005 | Kim | ..................... | H04B 7/0417 375/267 |
| 2006/0098754 A1* | 5/2006 | Kim | ..................... | H04B 7/0426 375/267 |
| 2007/0066230 A1* | 3/2007 | Zhang | .................. | H04B 7/0452 455/67.11 |
| 2008/0063115 A1* | 3/2008 | Varadarajan | ......... | H04B 7/0417 375/299 |

(Continued)

OTHER PUBLICATIONS

N. Valliappan, "Antenna Subset Modulation for Secure Millimeter-Wave Wireless Communication", 2013 IEEE.*

(Continued)

*Primary Examiner* — Shawkat M Ali
(74) *Attorney, Agent, or Firm* — Thomas | Horstemeyer, LLP

(57) ABSTRACT

Disclosed are techniques for channel-based coding for wireless communications. A transmitter includes circuitry and multiple antennas. The circuitry selects a subset of the antennas, determines a respective channel response for each of the antennas in the subset, generates a respective coded system for each of the antennas in the subset, and transmits the coded symbols using the antennas in the subset.

20 Claims, 5 Drawing Sheets

(56) References Cited

U.S. PATENT DOCUMENTS

| | | | | |
|---|---|---|---|---|
| 2008/0170523 | A1* | 7/2008 | Han | H04B 7/0413 370/310 |
| 2008/0205533 | A1* | 8/2008 | Lee | H04B 7/0671 375/260 |
| 2010/0067605 | A1* | 3/2010 | Jongren | H04B 7/0417 375/267 |
| 2010/0232533 | A1* | 9/2010 | Lee | H04B 7/0417 375/267 |
| 2011/0053633 | A1* | 3/2011 | Han | H04B 7/024 455/522 |
| 2011/0080968 | A1* | 4/2011 | Seo | H04B 7/0417 375/267 |
| 2012/0014469 | A1* | 1/2012 | Zhou | H04B 1/71072 375/267 |
| 2012/0069768 | A1* | 3/2012 | Ghassemzadeh | H04B 7/061 370/252 |

OTHER PUBLICATIONS

Lakshmannan, Sriram, et al., Securing Wireless Data Networks against Eavesdropping Using Smart Antennas ICDCS 2008, The 28th International Conference on Jun. 17-20, 2008 in Beijing. DOI:10.1109/ICDCS.2008.87.

Li, Xiaohua, et al., "Using Antenna Array Redundancy and Channel Diversity for Secure Wireless Transmissions" Journal of Communications—JCM, vol. 2, No. 3, pp. 24-32, 2007 DOI:10.4304/jcm. 2.3.24-32.

Wang, Ting, et al., "Enhancing Wireless Communication Privacy with Artificial Fading", pp. 173-181, 2012 IEEE 9th International Conference on Mobile Ad-Hoc and Sensor Systems (MASS), 2012.

Nachiappan Valliappan, et al., "Antenna Subset Modulation for Secure Millimeter-Wave Wireless Communication", IEEE Transactions on, vol. 61, No. 8, pp. 3231, 3245, Aug. 2013.

* cited by examiner

CHANNEL-BASED CODING FOR WIRELESS COMMUNICATIONS

CROSS-REFERENCE TO RELATED APPLICATIONS

The present application is a non-provisional of, and claims priority to, U.S. Provisional Application No. 62/025,167, filed on Jul. 16, 2014 and titled "CHANNEL-BASED CODING FOR WIRELESS COMMUNICATIONS," which is incorporated by reference herein in its entirety.

BACKGROUND

Computing devices can often communicate with each other over communications channels. Such communications channels can include wired communications channels as well as wireless communications channels. When a computing device communicates with another computing device over a wireless communication channel, other computing devices can sometimes intercept the data being transmitted.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure is directed towards channel-based coding for wireless communications. As will be described in further detail below, the channel-based coding described herein may be used so that an intended receiver is able to receive and process data that has been wirelessly transmitted, while an unintended receiver may not be able to receive and/or process the data.

Figure 1:
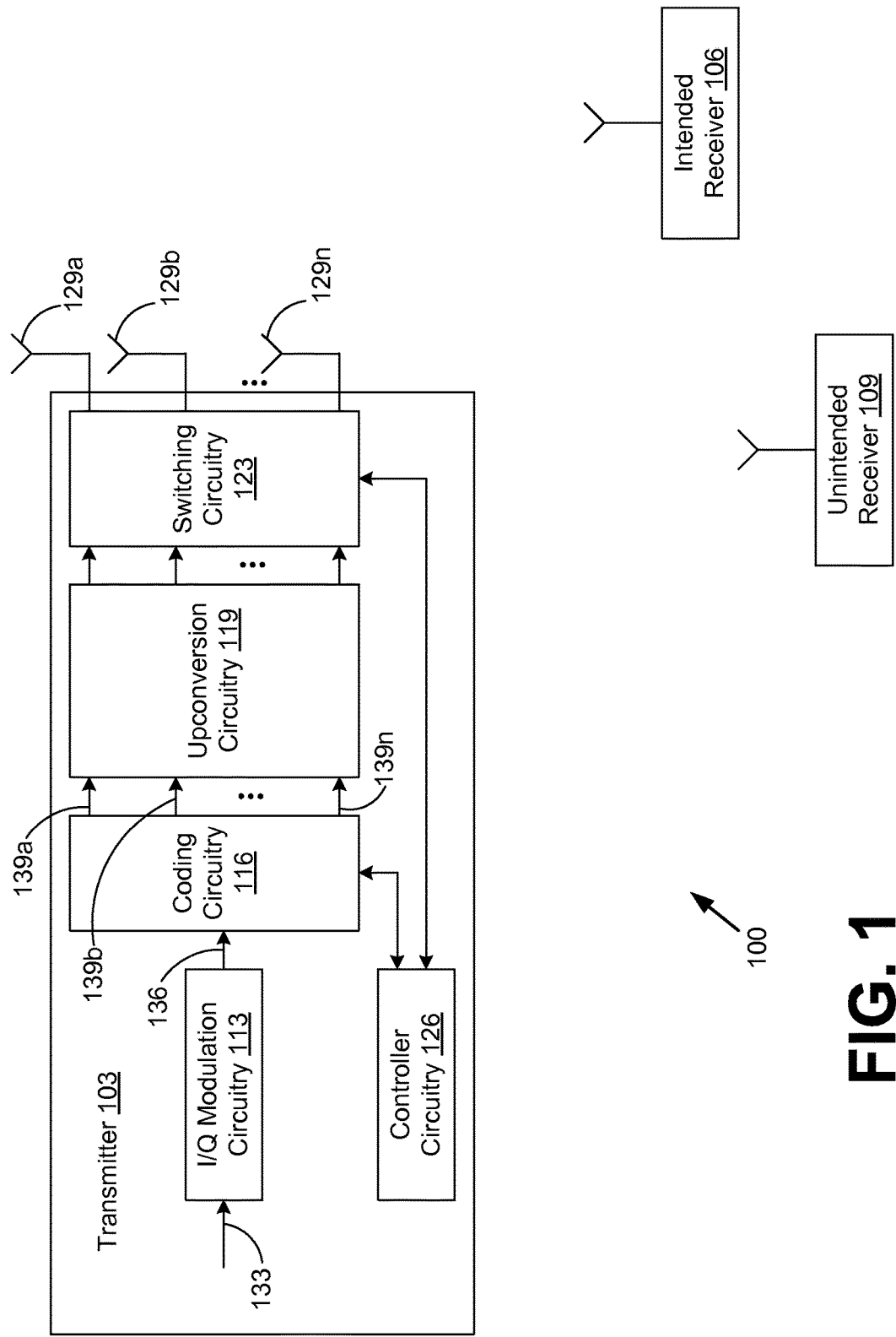
FIG. 1 is a drawing of an example of a communication environment.

With reference to FIG. 1, shown is an example of a communication environment 100. The communication environment 100 shown in FIG. 1 includes a transmitter 103, an intended receiver 106, and an unintended receiver 109. The transmitter 103 comprises circuitry and other components. Such circuitry may be general purpose hardware or hardware that is dedicated to performing one or more particular functions. The circuitry may include, but is not limited to, discrete components, integrated circuits, or any combination thereof. Such integrated circuits may include, but are not limited to, one or more amplifiers, mixers, filters, oscillators, tuners, microprocessors, system-on-chips, application-specific integrated circuits, digital signal processors, microcomputers, central processing units, programmable logic devices, state machines, and/or any suitable combination thereof. The circuitry may also include interconnects, such as lines, wires, traces, metallization layers, or any other element through which components may be coupled. The circuitry may be arranged to perform the various functionality described herein by generating and/or responding to electrical or other types of signals. Additionally, the circuitry may be configured to execute computer instructions to implement the functionality described herein.

As shown in FIG. 1, the transmitter 103 may include I/Q modulation circuitry 113, coding circuitry 116, upconversion circuitry 119, switching circuitry 123, controller circuitry 126, and/or other components. Additionally, the transmitter 103 includes multiple antennas 129a-129n.

The I/Q modulation circuitry 113 may receive an input signal 133 and generate I/Q modulation symbols 136 that correspond to the input signal 133. As non-limiting examples, the I/Q modulation symbols 136 may comprise Binary Phase-Shift Keyed (BPSK) symbols, Quadrature Phase-Shift Keyed (QPSK) symbols, Quadrature Amplitude Modulation (QAM) symbols, or any other suitable type of symbols.

The coding circuitry 116 may receive the I/Q modulation symbols 136 and generate coded symbols 139a-139n. As will be described in further detail below, the coded symbols 139a-139n may be versions of the I/Q modulation symbols 136 that have been modified based on channel responses between the transmitter 103 and the intended receiver 106.

The upconversion circuitry 119 receives the coded symbols 139a-139n and processes the coded symbols 139a-139n for wireless transmission via a selected subset of the antennas 129a-129n. For example, the upconversion circuitry 119 may filter, modulate, amplify, and/or perform other processing on the coded symbols 139a-139n so that the coded symbols 139a-139n may be wirelessly transmitted as radio frequency (RF) signals.

The switching circuitry 123 may route the coded symbols 139a-139n from the upconversion circuitry 119 to a selected subset of the antennas 129a-129n. The controller circuitry 126 may be coupled to the switching circuitry 123 and select the particular antennas 129a-129n that are to be used to transmit the coded symbols 139a-139n. Additionally, the controller circuitry 126 may provide information, such as coding parameters, to the coding circuitry 116 so that the I/Q modulation symbols 136 may be coded based on channel responses, as will be described in further detail below.

Next, a general discussion of an example of the operation of the communication environment 100 is provided. The following discussion assumes that the I/Q modulation circuitry 113 has already generated an I/Q modulation symbol 136 for the input signal 133. In the following discussion, a specific order of performance is described. However, it is understood that the order of performance may differ from that which is described. For example, various steps in the order of performance may be switched relative to the order presented herein. Also, two or more steps may be performed concurrently or with partial concurrence. All such orders of performance are within the scope of the present disclosure.

To begin, the controller circuitry 126 may select a subset of the antennas 129a-129n that will be used to wirelessly transmit data for a particular time period. For example, M of the antennas 129a-129n may be selected, wherein M is a number greater than 1 and less than the total number of antennas 129a-129n. The particular subset of the antennas 129a-129n that is selected may be randomized in various embodiments.

The controller circuitry 126 may then determine a channel response between the transmitter 103 and the intended receiver 106 for each of the selected antennas 129a-129n. The channel response may take into account Rayleigh fading or any other property of the communications channel between the transmitter 103 and the intended receiver 106. To determine the channel response, various procedures may be used. In some embodiments, a feedback system between the transmitter 103 and the intended receiver 106 may be used to receive information describing the channel response as measured or estimated by the intended receiver 106. In other embodiments, the channel response may be estimated using, for example, channel reciprocity where the transmitter can use the estimated channel response in the reverse link stage of the communication.

With the channel response for each of the selected antennas 129a-129n determined, the coding circuitry 116 may generate coded symbols 139a-139n. In particular, each of the coded symbols 139a-139n is generated based on the channel response between the corresponding antenna 129a-129n and the intended receiver 106. More specifically, the I/Q modulation symbol 136 may be coded so that when the coded symbols 139a-139n are upconverted by the upconversion circuitry 119 and then transmitted as RF signals via the corresponding antennas 129a-129n to the intended receiver 106, vectors in the I/Q plane representing the received coded symbols 139a-139n may be aligned. The effective symbol that may be received by the intended receiver 106 may be a combination of the received coded symbols 139a-139n. As such, the combined symbol that may be received by the intended receiver 106 may have constellation points with relatively large magnitudes because the vectors in the I/Q plane representing the coded symbols 139a-139n may align.

The channel responses between the antennas 129a-129n and the unintended receiver 109 are likely different from those between the antennas 129a-129n and the intended receiver 106. Thus, vectors in the I/Q plane representing the coded symbols 139a-139n received by the unintended receiver 109 are likely not aligned. As such, the effective symbol that is received by the unintended receiver 109 may have constellation points with relatively small magnitudes.

Next, the controller circuitry 126 may select another subset of the antennas 129a-129n for transmitting data. The number M of antennas 129a-129n selected may be the same as the number M of antennas 129a-129n that was previously selected. Similar to the embodiments described above, coded symbols 139a-139d are generated based on the channel responses corresponding to the selected antennas 129a-129n. Thus, when the coded symbols 139a-139n are received by the intended receiver 106, vectors in the I/Q plane representing the newly received coded symbols 139a-139n may be aligned. Additionally, from the perspective of the intended receiver 106, the constellation for the received coded symbols 139a-139n may remain relatively constant, even though the antennas 129a-129n used to transmit the data have been changed. By contrast, from the perspective of the unintended receiver 109, the constellation for the received coded symbols 139a-139n may change whenever the antennas 129a-129n are switched. The process described above may be repeated to send one or more sets of coded symbols 139a-139n.

Figure 2:
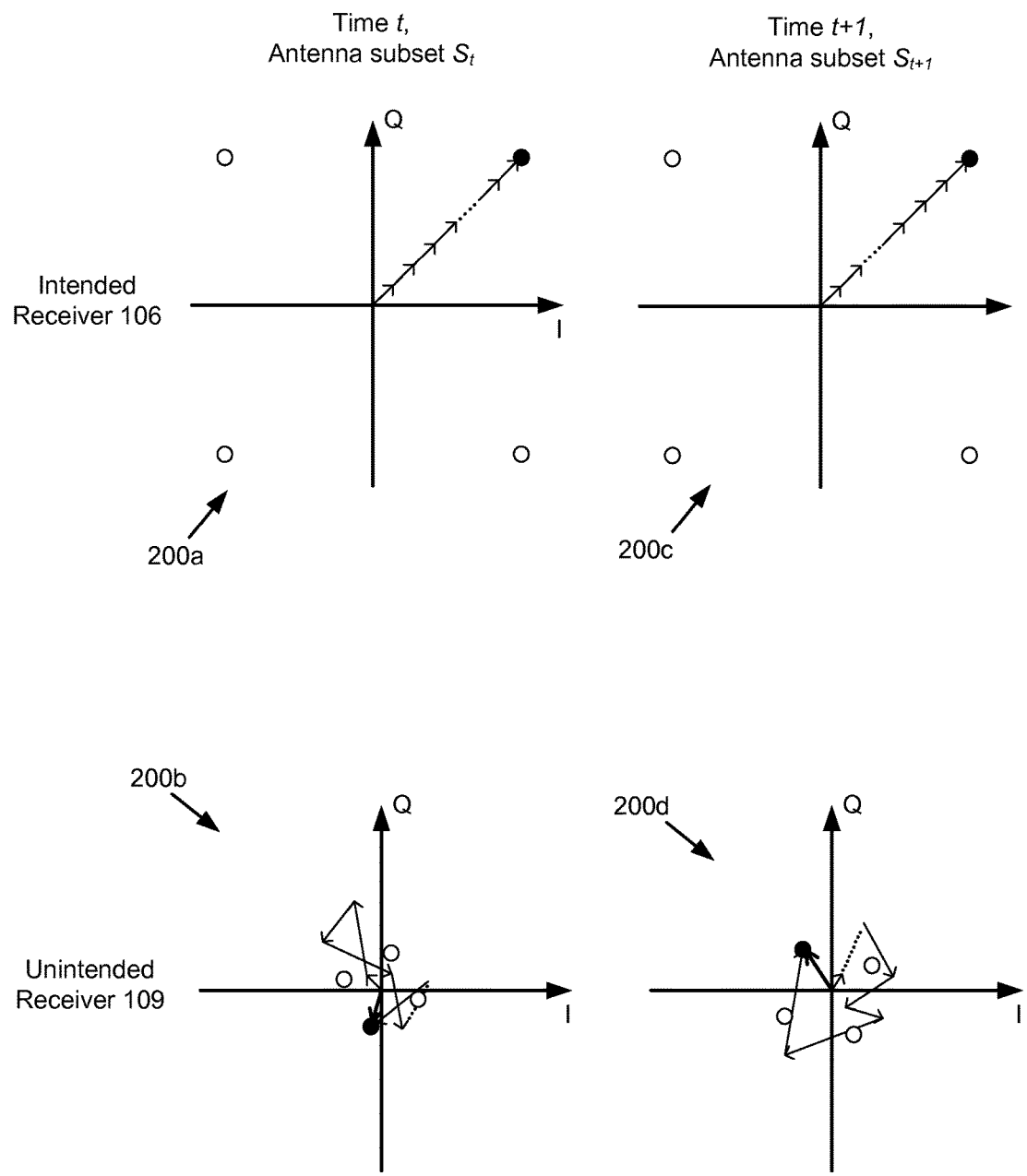
FIGS. 2-3 illustrate constellation diagrams representing examples of coded symbols received by an intended receiver and an unintended receiver of the communication environment of FIG. 1.

With reference to FIG. 2, shown are constellation diagrams 200a-200d representing received coded symbols 139a-139n according to various embodiments. In particular, the constellation diagrams 200a and 200c represent the coded symbols 139a-139n as received by the intended receiver 106 at times t and t+1, respectively. Similarly, the constellation diagrams 200b and 200d represent the coded symbols 139a-139n as received by the unintended receiver 109 at times t and t+t, respectively. For the constellation diagrams 200a-200d, a first subset of the antennas 129a-129n was used for time t, and a second subset of the antennas 129a-129n was used for time t+1.

Because the coded symbols 139a-139n were generated based on the channel responses for the intended receiver 106, the constellation points in the constellation diagram 200a for the intended receiver 106 have greater magnitudes than the constellation points in the constellation diagram 200b for the unintended receiver 109. Additionally, the constellation for the intended receiver 106 stay relatively constant from time t to time t+1, as shown in the constellation diagrams 200a and 200c. By contrast, the constellation for the unintended receiver 109 changes once the second subset of antennas 129a-129n is used, as shown in the constellation diagrams 200b and 200d.

Figure 3:
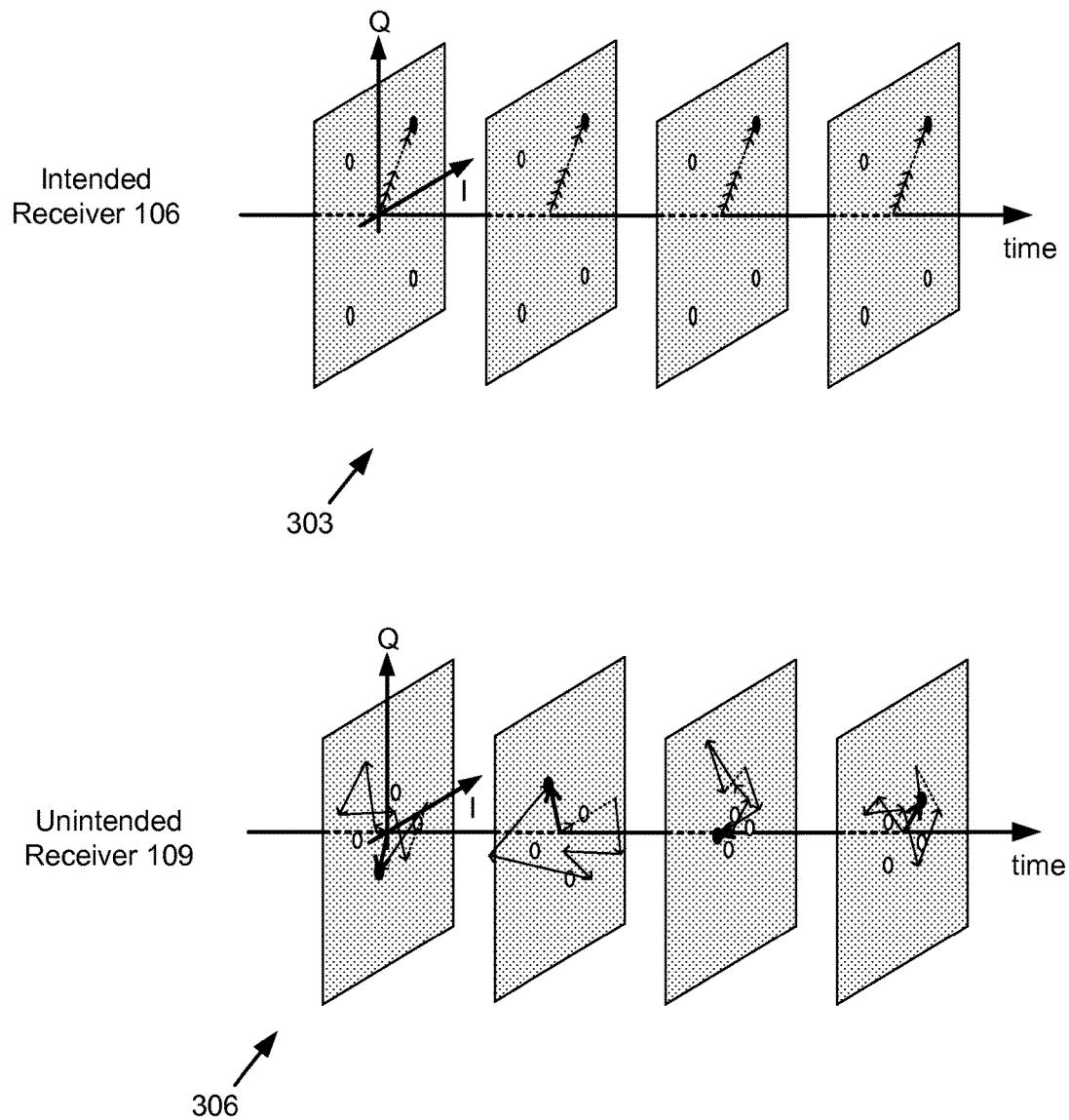

With reference to FIG. 3, shown is a diagram 303 that illustrates the constellations for coded symbols 139a-139n received by the intended receiver 106 over a period of time in which the selected antennas 129a-129n used to transmit the coded symbols 139a-139n has changed multiple times. As shown, the constellation stays relatively constant over time for the intended receiver 106.

Diagram 306 illustrates constellations for coded symbols 139a-139n received by the unintended receiver 109 over a period of time in which the selected antennas 129a-129n used to transmit coded symbols 139a-139n has changed multiple times. As shown, the constellation may change every time the selected antennas 129a-129n change for the unintended receiver 109.

In some embodiments of the present disclosure, a frequency hopping scheme in conjunction with the coding scheme discussed above may be used. In such a frequency hopping scheme, the transmitter 103 may be capable of transmitting data using multiple frequency channels. The controller circuitry 126 may select one of the frequency channels on which the coded symbols 139a-139n are to be transmitted using selected antennas 129a-129c. When the coded symbols 139a-139n are transmitted on the selected frequency channel, mock data (e.g., data that is not representative of meaningful information and that is intended to deceive the unintended receiver 109) may be transmitted on the other frequency channels. Thereafter, the controller circuitry 126 may then select another frequency channel and/or another set of antennas 129a-129n. The same or different coded symbols 139a-139n may be transmitted on the selected frequency, while mock data may be transmitted on the other frequency channel. This process may be repeated.

In embodiments using such a frequency hopping scheme, the intended receiver may scan the frequencies at which the transmitter 103 is capable of transmitting. Because the coded symbols 139a-139n have been generated based on the channel responses between the selected antennas 129a-129n and the intended receiver 106, the intended receiver 106 may detect the particular frequency channel on which the coded symbols 139a-139n have been transmitted without having prior knowledge that the frequency channel was used. More specifically, because the constellation for a set of received coded symbols 139a-139n has constellation points with relatively large magnitudes, the intended receiver 106 may detect the frequency channel by comparing the constellation points to a threshold value. If a value for the constellation points exceeds the threshold value, the intended receiver 106 may assume that the correct frequency channel has been detected.

Additionally, because the coded symbols 139a-139n have been generated based on the channel responses between the selected antennas 129a-129n and the intended receiver 106, the unintended receiver 109 may not be able to detect the particular frequency channels that are being used. As such, it may be difficult for an entity associated with the unintended receiver 109 to interrupt transmissions from the transmitter 103 using frequency jamming techniques.

Figure 4:
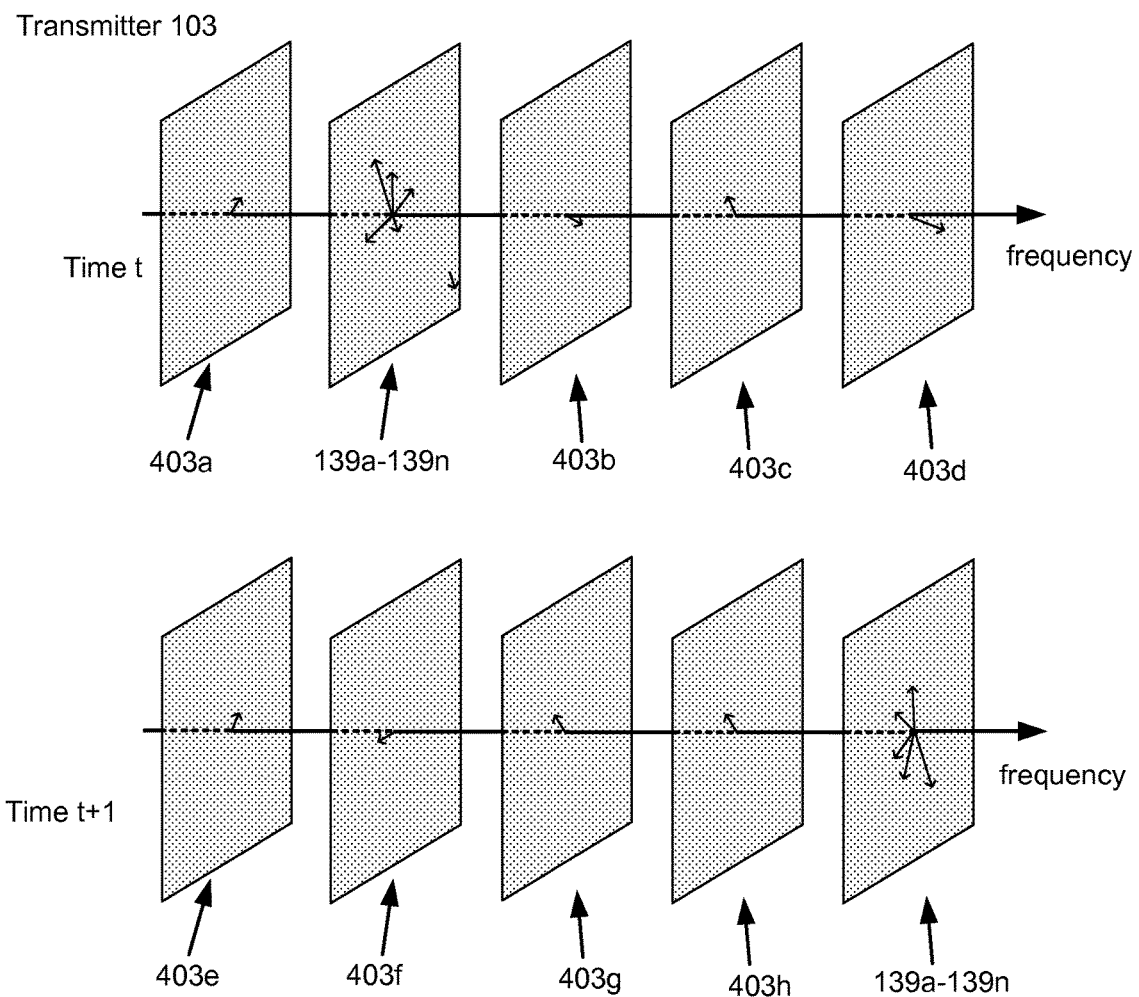
FIG. 4 illustrates constellation diagrams representing examples of coded symbols transmitted by a transmitter of the communication environment of FIG. 1.

With reference to FIG. 4, shown is an example of constellation diagrams representing data transmitted by the transmitter 103 at times t and t+1 using the frequency hopping scheme described above. In FIG. 4, each constellation diagram for time t represents data transmitted by the transmitter 103 on a particular frequency channel at time t. Similarly, each constellation diagram for time t+1 represents data transmitted by the transmitter 103 on a particular frequency at time t+1. As shown, for each time t and t+1, coded symbols 139a-139n are transmitted on a particular frequency channel, while mock data 403a-403h is transmitted on the other frequency channels.

Figure 5:
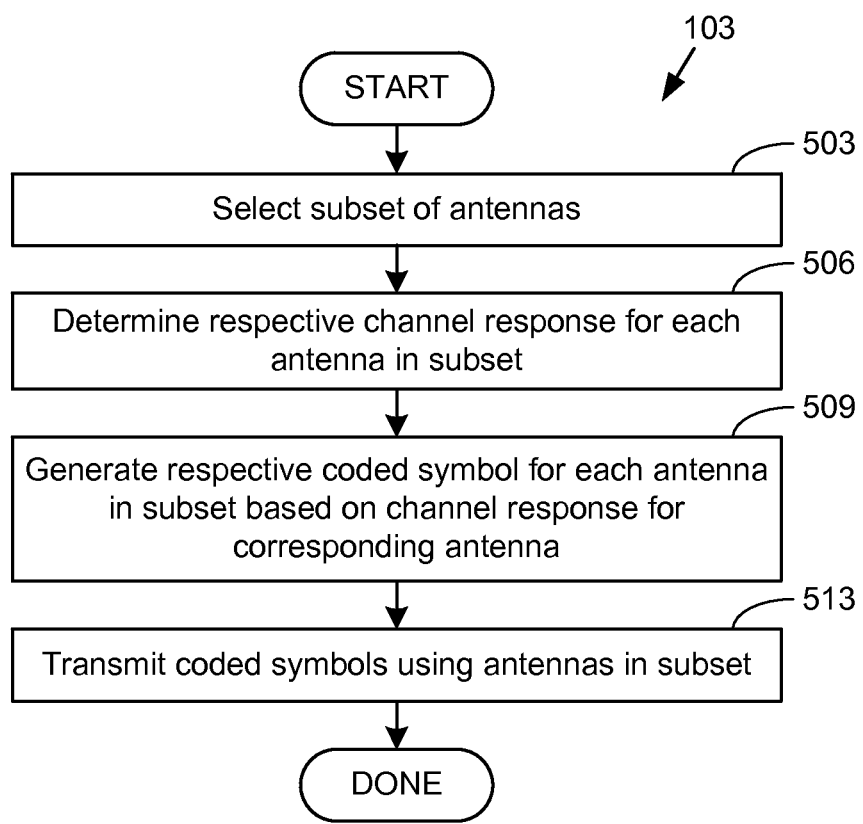
FIG. 5 is a flowchart illustrating an example of functionality implemented by a transmitter in the communication environment of FIG. 1.

With reference to FIG. 5, shown is a flowchart that represents an example of a portion of the functionality of the transmitter 103 according to various embodiments. The flowchart of FIG. 5 provides merely an example of the many different types of functional arrangements that may be employed to implement the operation of the portion of the transmitter 103 as described herein. The flowchart of FIG. 5 may be viewed as depicting an example of elements of a method implemented by the transmitter 103.

Beginning with box 503, the transmitter 103 may select a subset of the antennas 129a-129n. At box 506, the transmitter 103 may determine the respective channel responses for each antenna 129a-129n in the selected subset of antennas 129a-129n.

The transmitter 103 may then generate a respective coded symbol 139a-139n for each antenna 129a-129n in the selected subset of antennas 129a-129n based on the determined channel response for the corresponding antenna 129a-129n, as shown at box 509. At box 513, the transmitter 103 may transmit the generated coded systems 139a-139n using the antennas 129a-129n in the selected subset of antennas 129a-129n.

The flowchart of FIG. 5 shows an example of the functionality and operation of implementations of transmitter 103. The functionality and operation of the transmitter 103 can be executed by hardware, software, or a combination of hardware and software. If executed by software, each box in the flowchart of FIG. 5 may represent a module or a portion of code that includes computer instructions to implement the specified logical functions. The computer instructions can be embodied in the form of source code that comprises human-readable statements written in a programming language or machine code that comprises machine instructions recognizable by a suitable execution system, such as a processor in a computer system. If executed hardware, each box can represent a circuit or a number of interconnected circuits that implement the specified logical functions.

Although the flowchart of FIG. 5 shows a specific order of execution, it is understood that the order of execution may differ from that which is shown. For example, the order of execution of two or more boxes can be switched relative to the order shown. Also, two or more boxes shown in succession can be executed concurrently or with partial concurrence. Further, in some examples, one or more of the boxes shown in the flowchart can be skipped or omitted. In addition, any number of counters, state variables, warning semaphores, or messages can be added to the logical flow described herein, for purposes of enhanced utility, accounting, performance measurement, or troubleshooting aid. All such variations are within the scope of the present disclosure.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Unless indicated otherwise, such disjunctive language is not generally intended to imply that certain embodiments require at least one of X, at least one of Y, or at least one of Z to each be present.

The above-described embodiments of the present disclosure are merely examples of implementations to set forth for a clear understanding of the principles of the disclosure. Many variations and modifications may be made to the above-described embodiments without departing substantially from the spirit and principles of the disclosure. All such modifications and variations are intended to be included herein within the scope of this disclosure.

Therefore, the following is claimed:

1. A transmitter, comprising:
a plurality of antennas; and
circuitry that:
  generates an I-Q (in-phase and quadrature) modulation symbol;
  for a first time period:
    selects a first subset of the plurality of antennas;
    determines a respective first channel response for each of the plurality of antennas in the first subset;
    generates a respective first coded symbol for each of the plurality of antennas in the first subset based on the I-Q modulation symbol and the respective first channel response for the corresponding one of the plurality of antennas, such that, when the plurality of first coded symbols are received by an intended receiver, a plurality of first vectors for the plurality of first coded symbols align along an I-Q plane and combine to represent the I-Q modulation symbol; and
    transmits the plurality of first coded symbols using the plurality of antennas in the first subset; and
  for a second time period:
    selects a second subset of the plurality of antennas;
    determines a respective second channel response for each of the plurality of antennas in the second subset;
    generates a respective second coded symbol for each of the plurality of antennas in the second subset based on the I-Q modulation symbol and the respective second channel response for the corresponding one of the plurality of antennas, such that, when the plurality of second coded symbols are received by the intended receiver, a plurality of second vectors for the plurality of second coded symbols align along the I-Q plane and combine to represent the I-Q modulation symbol; and
    transmits the plurality of second coded symbols using, the plurality of antennas in the second subset.

2. The transmitter of claim 1, wherein the circuitry generates the plurality of first coded symbols such that, when the plurality of first coded symbols are received by an unintended receiver, a plurality of additional vectors for the plurality of first coded symbols do not align along the I-Q plane.

3. The transmitter of claim 1, wherein the circuitry randomly selects the first subset of the plurality of antennas.

4. The transmitter of claim 1, wherein the plurality of antennas are configured to transmit on a plurality of frequency channels;
wherein the circuitry selects one of the plurality of frequency channels; and
wherein the plurality of first coded symbols are transmitted on the selected one of the plurality of frequency channels.

5. The transmitter of claim 4, wherein the circuitry randomly selects the one of the plurality of frequency channels.

6. The transmitter of claim 1, wherein the circuitry determines at least one of the plurality of first channel responses by at least estimating a channel reciprocity.

7. The transmitter of claim 1, wherein the circuity determines at least one of the plurality of first channel responses by at least determining a reverse link stage channel response.

8. A method, comprising:
generating an I-Q (in-phase, and quadrature) modulation symbol;
for a first time period:
selecting a first subset of a plurality of antennas;
determining a respective first channel response for each of the plurality of antennas in the first subset;
generating a respective first coded symbol for each of the plurality of antennas in the first subset based on the I-Q modulation symbol and the respective first channel response for the corresponding one of the plurality of antennas, such that, when the plurality of first coded symbols are received by an intended receiver, a plurality of first vectors for the plurality of first coded symbols align along an I-Q plane and combine to represent the I-Q modulation symbol; and
transmitting the plurality of first coded symbols using the plurality of antennas in the first subset; and
for a second time period:
selecting a second subset of the plurality of antennas;
determining a respective second channel response for each of the plurality of antennas in the second subset;
generating a respective second coded symbol for each of the plurality of antennas in the second subset based on the I-Q modulation symbol and the respective second channel response for the corresponding one of the plurality of antennas, such that, when the plurality of second coded symbols are received by the intended receiver, a plurality of second vectors for the plurality of second coded symbols align along the I-Q plane and combine to represent the I-Q modulation symbol; and
transmitting the plurality of second coded symbols using, the plurality of antennas in the second subset.

9. The method of claim 8, wherein the plurality of first coded symbols are generated such that, when the plurality of first coded symbols are received by an unintended receiver, a plurality of additional vectors for the plurality of first coded symbols do not align along the I-Q plane.

10. The method of claim 8, wherein the first subset of the plurality of antennas is randomly selected.

11. The method of claim 8, further comprising selecting one of a plurality of frequency channels on which the plurality of antennas are configured to transmit; and
wherein the plurality of first coded symbols are transmitted on the selected one of the plurality of frequency channels.

12. The method of claim 11, wherein selecting the one of the plurality of frequency channels comprises randomly selecting the one of the plurality of frequency channels.

13. The method of claim 8, wherein determining at least one of the plurality of first channel responses comprises estimating a reverse link stage channel response.

14. A non-transitory computer readable medium storing a plurality of computer instructions that, when executed, causes circuitry to at least:
generate an I-Q (in-phase and quadrature) modulation symbol;
for a first time period:
select a first subset of a plurality of antennas;
determine a respective first channel response for each of the plurality of antennas in the first subset;
generate a respective first coded symbol for each of the plurality of antennas in the first subset based on the I-Q modulation symbol and the respective first channel response for the corresponding one of the plurality of antennas, such that, when the plurality of first coded symbols are received by an intended receiver, a plurality of first vectors for the plurality of first coded symbols align along an I-Q plane and combine to represent the I-Q modulation symbol; and
transmit the plurality of first coded symbols using the plurality of antennas in the first subset; and
for a second time period:
select a second subset of the plurality of antennas;
determine a respective second channel response for each of the plurality of antennas in the second subset;
generate a respective second coded symbol for each of the plurality of antennas in the second subset based on the I-Q modulation symbol and the respective second channel response for the corresponding one of the plurality of antennas, such that, when the plurality of second coded symbols are received by the intended receiver, a plurality of second vectors for the plurality of second coded symbols align along the I-Q plane and combine to represent the I-Q modulation symbol; and
transmit the plurality of second coded symbols using the plurality of antennas in the second subset.

15. The non-transitory computer readable medium of claim 14, wherein the plurality of computer instructions, when executed, further cause the circuitry to at least generate the plurality of first coded symbols such that, when the plurality of first coded symbols are received by an unintended receiver, the plurality of first vectors for the plurality of first coded symbols do not align along the I-Q plane.

16. The non-transitory computer readable medium of claim 14, wherein the plurality of computer instructions, when executed, further cause the circuitry to at least randomly select the first subset of the plurality of antennas.

17. The non-transitory computer readable medium of claim 14, wherein the plurality of antennas are configured to transmit on a plurality of frequency channels;
wherein the plurality of computer instructions, when executed, further cause the circuitry to at least:
select one of the plurality of frequency channels; and
cause the plurality of first coded symbols to be transmitted on the selected one of the plurality of frequency channels.

18. The non-transitory computer readable medium of claim 17, wherein the plurality of computer instructions, when executed, further cause the circuitry to at least randomly select the one of the plurality of frequency channels.

19. The non-transitory computer readable medium of claim 14, wherein the I-Q modulation symbol comprises a Binary Phase-Shift Keyed (BPSK) symbol, a Quadrature Phase-Shift Keyed (QPSK) symbol, or a Quadrature Amplitude Modulation (QAM) symbol.

20. The non-transitory computer readable medium of claim 14, wherein the plurality of computer instructions, when executed, cause the circuitry to determine the plurality of first channel responses by at least measuring the plurality of first channel responses.

* * * * *